United States Patent
Hammond et al.

(10) Patent No.: US 7,913,246 B2
(45) Date of Patent: Mar. 22, 2011

(54) SYSTEM AND METHOD FOR UPDATING A SOFTWARE PROGRAM

(75) Inventors: Brad T. Hammond, North Kingstown, RI (US); Todd J. Giaquinto, Cumberland, RI (US); Daniel J. Redmond, Bradford, RI (US); Jim Higgins, North Kingstown, RI (US)

(73) Assignee: American Power Conversion Corporation, West Kingston, RI (US)

( * ) Notice: Subject to any disclaimer, the term of this patent is extended or adjusted under 35 U.S.C. 154(b) by 885 days.

(21) Appl. No.: 10/974,535

(22) Filed: Oct. 27, 2004

(65) Prior Publication Data

US 2005/0144616 A1     Jun. 30, 2005

Related U.S. Application Data

(60) Provisional application No. 60/514,633, filed on Oct. 27, 2003.

(51) Int. Cl.
  *G06F 9/44* (2006.01)
  *G06F 9/445* (2006.01)
  *G06F 15/173* (2006.01)
  *G06F 1/00* (2006.01)
  *H04Q 1/30* (2006.01)

(52) U.S. Cl. ........ 717/173; 717/178; 340/538; 709/224; 713/300

(58) Field of Classification Search ............ 717/173, 717/172, 178
See application file for complete search history.

(56) References Cited

U.S. PATENT DOCUMENTS

| 5,381,554 | A | * | 1/1995 | Langer et al. ............ 714/14 |
| 5,845,090 | A | | 12/1998 | Collins, III et al. |
| 5,860,012 | A | * | 1/1999 | Luu ............ 717/175 |
| 5,919,247 | A | | 7/1999 | Van Hoff et al. |
| 5,930,513 | A | | 7/1999 | Taylor |
| 5,960,204 | A | | 9/1999 | Yinger et al. |
| 5,961,604 | A | * | 10/1999 | Anderson et al. ........ 709/229 |
| 6,006,034 | A | * | 12/1999 | Heath et al. ............ 717/170 |
| 6,006,035 | A | | 12/1999 | Nabahi |
| 6,067,582 | A | | 5/2000 | Smith et al. |
| 6,167,567 | A | | 12/2000 | Chiles et al. |

(Continued)

FOREIGN PATENT DOCUMENTS

DE     10228142 A1     2/2003

(Continued)

OTHER PUBLICATIONS

Craig Hunt, "TCP/IP Network Administration Third Edition", Apr. 2002, O'Reilly , ISBN: -596-00297-1, retrieved from <http://docstore.mik.ua/orelly/networking_2ndEd/tcp/index.htm>, pp. 1-18.*

(Continued)

*Primary Examiner* — Tuan Q Dam
*Assistant Examiner* — Marina Lee
(74) *Attorney, Agent, or Firm* — Lando & Anastasi, LLP

(57) ABSTRACT

A system and method of provided for automatically update a system's software. In one example, the software is updated without requiring user intervention. Further, a system is provided that is capable of performing a software update on a non-PC system, such as a networking device, uninterruptible power supply (UPS), or other system. In another example, a system and method is provided for updating multiple components of a system by a proxy system responsible for downloading and applying updates.

25 Claims, 12 Drawing Sheets

U.S. PATENT DOCUMENTS

| | | | |
|---|---|---|---|
| 6,199,204 B1 | 3/2001 | Donohue | |
| 6,219,703 B1* | 4/2001 | Nguyen et al. | 709/224 |
| 6,256,668 B1 | 7/2001 | Slivka et al. | |
| 6,266,811 B1 | 7/2001 | Nabahi | |
| 6,282,709 B1 | 8/2001 | Reha et al. | |
| 6,282,711 B1 | 8/2001 | Halpern et al. | |
| 6,301,710 B1 | 10/2001 | Fujiwara | |
| 6,314,565 B1* | 11/2001 | Kenner et al. | 717/171 |
| 6,446,260 B1* | 9/2002 | Wilde et al. | 717/173 |
| 6,457,076 B1* | 9/2002 | Cheng et al. | 710/36 |
| 6,493,871 B1 | 12/2002 | McGuire et al. | |
| 6,553,416 B1* | 4/2003 | Chari et al. | 709/224 |
| 6,698,018 B1 | 2/2004 | Zimniewicz et al. | |
| 6,725,377 B1* | 4/2004 | Kouznetsov | 726/23 |
| 6,795,965 B1 | 9/2004 | Yadav | |
| 6,865,685 B2* | 3/2005 | Hammond et al. | 713/340 |
| 7,082,541 B2* | 7/2006 | Hammond et al. | 713/300 |
| 7,089,548 B2* | 8/2006 | Lin | 717/168 |
| 7,093,246 B2* | 8/2006 | Brown et al. | 717/173 |
| 7,275,244 B1* | 9/2007 | Bell et al. | 717/168 |
| 7,519,909 B2* | 4/2009 | Kuiawa et al. | 715/736 |
| 7,724,675 B2* | 5/2010 | Kuo | 370/241 |
| 2002/0138775 A1* | 9/2002 | Hammond et al. | 713/310 |
| 2002/0138785 A1* | 9/2002 | Hammond et al. | 714/14 |
| 2003/0033550 A1* | 2/2003 | Kuiawa et al. | 713/340 |
| 2003/0066065 A1* | 4/2003 | Larkin | 717/177 |
| 2003/0132949 A1* | 7/2003 | Fallon et al. | 345/700 |
| 2004/0003266 A1* | 1/2004 | Moshir et al. | 713/191 |
| 2004/0015911 A1* | 1/2004 | Hinsley et al. | 717/147 |
| 2004/0039821 A1* | 2/2004 | Giglio et al. | 709/227 |
| 2005/0071699 A1* | 3/2005 | Hammond et al. | 713/300 |
| 2006/0143347 A1* | 6/2006 | Kuo | 710/106 |

FOREIGN PATENT DOCUMENTS

| | | |
|---|---|---|
| EP | 0703531 A | 3/1996 |
| WO | WO 01/90892 A | 11/2001 |

OTHER PUBLICATIONS

"PowerChute Network Shutdown, v. 2.2.1: Installation Guide (APC Part No. 990-2838A)", 2006 by American Power Conversion Corporation, retrieved from <http://sturgeon.apcc.com/techref.nsf/docID/30C4BC255BF56067802571D30050D963/$FILE/990-2838A-EN.htm#Installation> Total pp. 15.*

"Installation Guide PowerChute Plus Version 5.2.2 for Windows NT, Windows 200, and Window XP", Oct. 2001, by American Power Conversion Corporation, retrieved from <http://am.net/lib/tools/APC/PowerChute%205.2.3%20Installation%20Guide.pdf> Total pp. 22.*

* cited by examiner

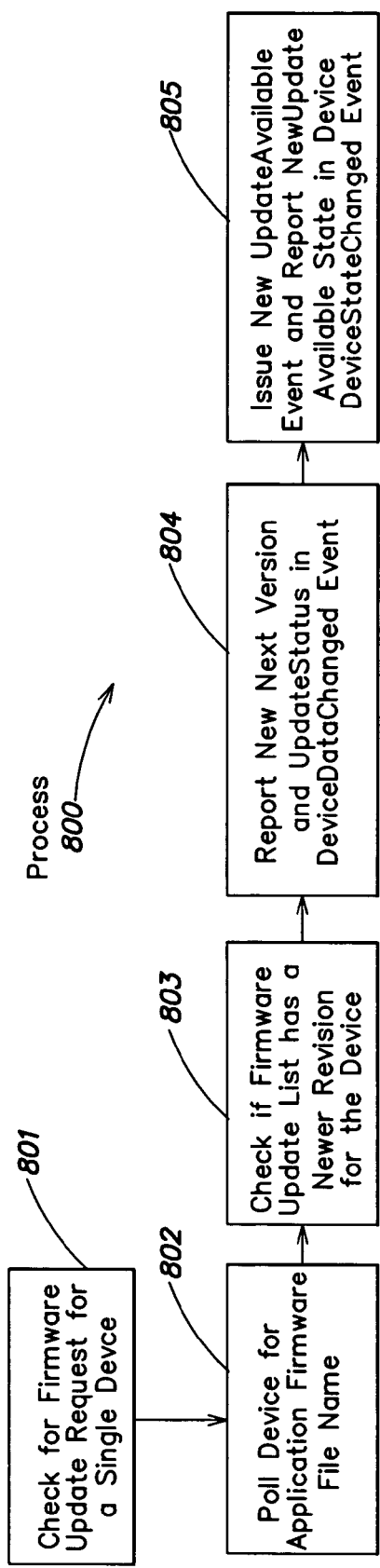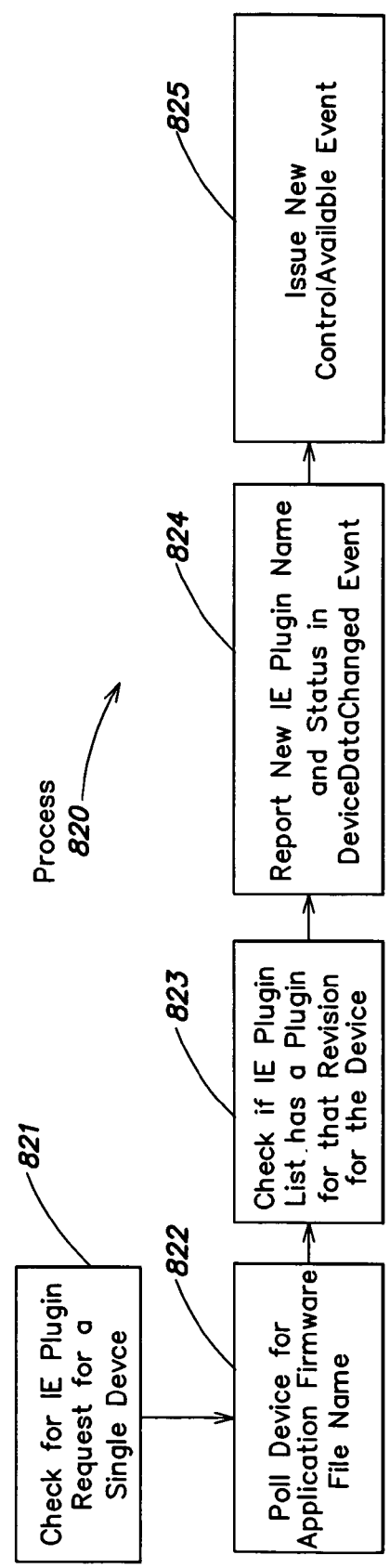

SYSTEM AND METHOD FOR UPDATING A SOFTWARE PROGRAM

RELATED APPLICATIONS

This application claims priority under 35 U.S.C. §119(e) to U.S. Provisional Application Ser. No. 60/514,633, entitled "SYSTEM AND METHOD FOR UPDATING A SOFTWARE PROGRAM," filed on Oct. 27, 2003, which is herein incorporated by reference in its entirety.

FIELD OF THE INVENTION

The present invention relates to software installation, and more particularly, to methods for updating a software program.

BACKGROUND

There are many conventional methods for updating software programs that execute on a general purpose computer such as a PC. More particularly, there are application programs and operating systems programs that include facilities for determining whether an update (e.g., a newer version) of the application or operating system program is available, downloading the update (e.g., over a communications network such as the Internet) and applying the update to the currently-installed program. For example, the Microsoft Windows XP operating system (available from Microsoft Corporation, Redmond, Wash.) includes a feature referred to as "Windows Update" that allows a program executing in an Internet browser program to determine the particular Windows XP operating system components installed on a personal computer.

The program is loaded and executed in a browser program (e.g., a Microsoft Explorer browser program) when a particular Internet site is accessed and configuration information relating to the local PC's operating system is transmitted to an update server located on the Internet. If updates are available, a list of the available updates is returned to a user in the browser. These available updates reflect those updates that are applicable to the current PC's software configuration. The user is presented an option to apply one or more of the updates, and to launch the update process that installs the updated software on the PC. However, the update is limited to the PC upon which the browser program is operating, and the Windows Update program needs user-intervention to determine whether to apply the updates.

There are other systems for updating software. For instance, applications such as Microsoft Internet Explorer browser application periodically contact an update server to determine whether there is an update available. This contact can be performed automatically by selecting a configuration option in the Internet Explorer program, or by manually performing a search for updates at a designated web site. However, the actual update install involves the user selecting whether he/she would like to install the update and configuring various aspects relating to the update. In any event, the update needs user intervention similar to the Windows update program discussed above. There are many other application programs (e.g., the Real One media player program available from Real Networks, Inc., Seattle, Wash. and Microsoft Windows Media Player program) that include similar capabilities for checking for available software updates and updating the program.

There are other types of software tools that can be used by an administrator to distribute software to multiple PCs such as, for example, the Microsoft Systems Management Server software program available from the Microsoft Corporation. However, these tools also require some degree of training to set and require manual intervention, as the administrator must manually choose which software applications will be distributed to selected PCs.

SUMMARY

There are many drawbacks of the currently-available update systems and procedures. Most conventional systems and procedures are designed for PCs involving user intervention during the update process. More particularly, most update processes direct a PC browser interface to a web site where the user is required to take further actions to download and apply the update. According to one aspect of the invention, it may be advantageous to automatically update a system's software without requiring user intervention. Further, it may be desirable to have a system that is capable of performing a software update on a non-PC system, such as a networking device, uninterruptible power supply (UPS), or other system.

Further, conventional software update systems and procedures are generally designed for checking and updating a single system. In one aspect of the present invention, it may be beneficial for a system to receive software updates from an update server and to apply those updates to one or more systems. In this manner, the system may centrally manage and perform the update process on multiple systems. This is beneficial for many reasons, including:

updates need not be performed on each system, requiring an administrator to visit each system to perform the software update—updates may be performed on multiple systems from a single system updates may be applied automatically on multiple systems, not requiring user intervention on behalf of an administrator updates may be more easily managed on the single system—conventionally, the administrator needs to inspect each system to determine that the updates are applied properly the update server is contacted fewer times (and is thus more frequently available) if a proxy server is able to download available updates and distribute them to other systems In another aspect of the invention, it is realized that it may be beneficial for a single system to be responsible for receiving and applying software updates. In another aspect, the single system may update a system that is not capable of communicating with the update server. For instance, the system to be updated may be a network device not having an interface or the appropriate controls and/or protocols for downloading and applying an update from an update server. Generally, network devices do not include user interfaces and other equipment interfaces to interact with an update server. Therefore, a proxy system is provided that can retrieve updates on behalf of the system to be updated, and apply the updates to the system. This proxy system may control, for example, which systems receive software updates, when they receive them, and other aspects of the update process.

According to another aspect of the present invention, a catalog of updates is downloaded from the update server and the server determines which updates need to be applied to particular systems. Because a catalog of updates is downloaded rather than the conventional update method of transmitting version information and other system information to the update server, updates are more securely applied, as information relating to the user's equipment and configurations is not transmitted to the update server.

In one embodiment, the catalog of updates is periodically downloaded and the proxy server compares information identifying one or more available updates with information identifying one or more managed systems. If an update matches a particular system, that update may be applied to the system. The proxy server may also be capable of updating its own software.

According to one aspect of the invention, a method is provided for updating software. The method comprises acts of providing for an update server, the update server being adapted to store one or more software updates, receiving, from the update server, a catalog of updates available from the update server, determining if at least one available update applies to at least one managed device, and if so, downloading the at least one available update and applying the at least one available update to the at least one managed device.

According to one aspect of the present invention, a method is provided for updating software in a system comprising an update server, the update server being adapted to store one or more software updates. The method comprises acts of receiving, from the update server, a catalog of updates available from the update server, determining if at least one available update referenced in the catalog of updates applies to at least one managed device; and, if so, downloading the at least one available update and applying the at least one available update to the at least one managed device.

According to one embodiment of the present invention, the method further comprises acts of maintaining a local catalog of updates, and merging the received catalog of updates with the local catalog of updates. According to another embodiment, the at least one available update comprises an operating system component and a management component, and wherein the act of applying the at least one available update further comprises applying the operating system component to the at least one managed device prior to applying the management component to the at least one managed device.

According to another embodiment, the acts of receiving, determining, downloading and applying are each performed by a secondary server. According to another embodiment, the act of determining comprises an act of comparing filename information of a file associated with the at least one available update to filename information of a current portion of software associated with the at least one managed device. According to another embodiment, the method further comprises an act of sending at least one file to the at least one managed device.

According to one embodiment of the present invention, the method further comprises an act of verifying that at least one file associated with the at least one available update is not corrupted, and wherein the act of verifying is performed prior to the act of applying. According to another embodiment, the acts of verifying and applying are each performed by a secondary server. According to another embodiment, the secondary server performs one or more updates for a plurality of managed devices.

According to another embodiment, the plurality of managed devices are each components of an Uninterruptible Power Supply (UPS) system, and wherein the secondary server applies the one or more updates to selected components of the UPS system. According to yet another embodiment, the method further comprises an act of determining, on behalf of a plurality of devices, whether an update exists on the update server.

According to another embodiment, the act of comparing filename information of the file associated with the at least one available update to the filename information to the current portion of software of the at least one managed device includes an act of comparing revision level information of the file associated with the at least one available update with revision level information of the current portion of software of the at least one managed device, and determining whether the at least one managed device should be updated based on the comparison. According to another embodiment, the method further comprises an act of determining whether the revision level of the at least one available update is a later revision of software as compared to the revision level file associated with the at least one available update to the filename information to the current portion of software of the at least one managed device.

According to another embodiment, the at least one available update comprises an operating system component and a management component, and wherein the act of applying the at least one available update further comprises applying the operating system component to the at least one managed device and applying the management component to at least one of the at least one managed device and a manager of the at least one managed device. According to another embodiment, the management component is applied to the at least one managed device if the at least one managed device is coupled to a public network. According to another embodiment, the management component is applied to the manager of the at least one managed device if the at least one managed device is coupled to a private network. According to another embodiment, the management component is applied to the manager of the at least one managed device if the manager is adapted to apply the at least one available update. According to another embodiment, the manager is adapted to perform the acts of receiving, determining, downloading, and applying the at least one available update.

According to another aspect of the present invention, a system is provided for updating a software component. The system comprises an update server configured to store a plurality of available updates, and a secondary server adapted to manage a plurality of devices, wherein the secondary server is adapted to determine whether any one of the plurality of available updates should be applied to at least one of the plurality of devices, and if so, applying at least one of the plurality of updates to the at least one of the plurality of devices. According to one embodiment of the present invention, the at least one of the plurality of updates comprises an operating system component and a management component, and wherein the secondary server is adapted to apply the operating system component to the at least one of the plurality of devices prior to applying the management component to the at least one of the plurality of devices.

According to another embodiment, the secondary server is adapted to compare filename information of a file associated with the at least one available update to filename information of a current portion of software of the at least one of the plurality of devices, and is adapted to determine whether the at least one of the plurality of devices should be updated based on the comparison. According to another embodiment, the secondary server comprises an interface adapted to receive a catalog of available updates from the update server.

According to another embodiment, the secondary server includes a memory for storing a local catalog of updates, and wherein the secondary server is adapted to merge the received catalog of updates with the local catalog of updates. According to another embodiment, the secondary server is adapted to compare filename information of a file associated with the at least one of the plurality of updates to filename information of a current portion of software associated with the at least one of the plurality of devices. According to another embodiment, the secondary server is adapted to load at least one file associated with the at least one of the plurality of updates to the at least one of the plurality of devices. According to another embodiment, the secondary server is adapted to determine whether the at least one of the plurality of devices should be updated based on the comparison. According to another embodiment, the plurality of managed devices are each components of an Uninterruptible Power Supply (UPS) system, and wherein the secondary server is adapted to apply the at least one update to one or more selected components of the UPS system.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

This invention is pointed out with particularity in the appended claims. The above and further advantages of this invention may be better understood by referring to the following description when taken in conjunction with the accompanying drawings in which similar reference numbers indicate the same or similar elements.

In the drawings,

FIG. 4 is a flow chart of a software update process according to one embodiment of the present invention;

FIG. 8 is a flow chart of a software update process according to one embodiment of the present invention;

DETAILED DESCRIPTION

Figure 1:
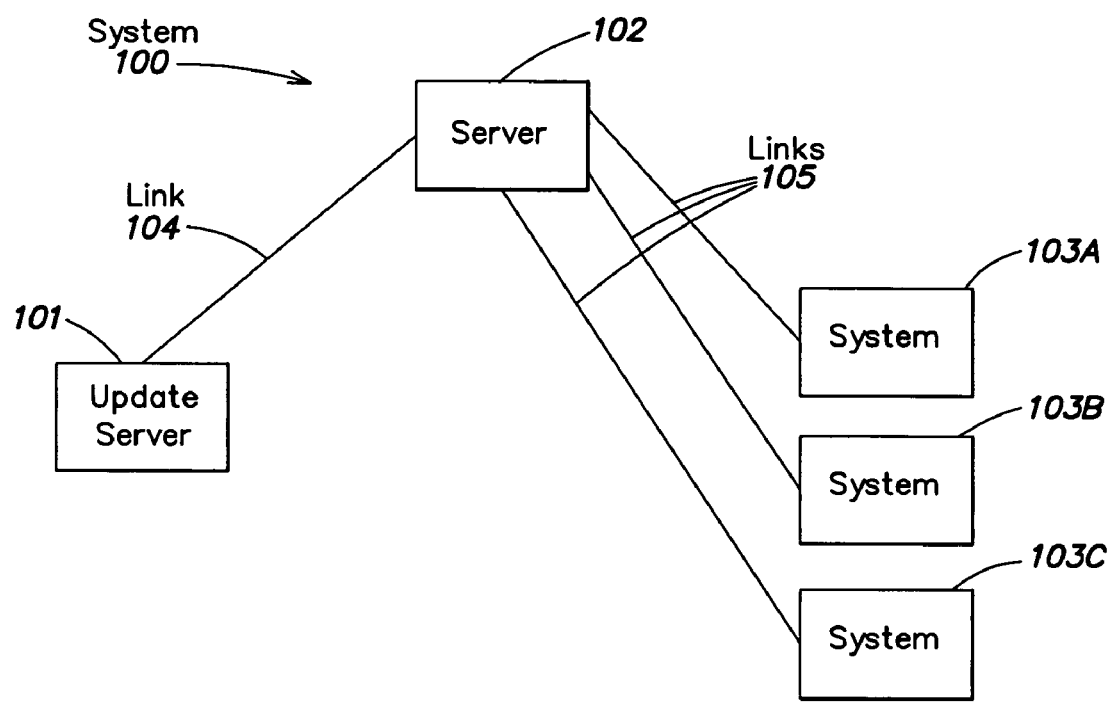
FIG. 1 is a block diagram of a system for updating a software program according to one embodiment of the present invention.

FIG. 1 shows a block diagram of a system for updating a software program according to one embodiment of the present invention. System 100 includes an update server 101 that stores one or more software updates to be applied to systems 103A-103C. Update server 101 communicates to other systems through a communication network. For instance, update server 101 may be an Internet server that is accessed through one or more public or private networks. For example, update server 101 may be a conventional web server that is capable of delivering software programs using one or more networking protocols, such as TCP/IP. Further, server 101 may be capable of providing files using one or more application-level protocols such as HTTP, FTP, or other protocols.

System 100 also includes a server 102 that is adapted to communicate with update server 101 through link 104. Link 104 may be, for example, one or more networks, components, and/or media that couples server 102 to update server 101. In one embodiment, server 102 is located within an enterprise network, and update server 101 is a web server located in the Internet. Server 102 is capable of communicating with update server 101 to determine whether software updates are available. If so, server 102 obtains information from update server 101 that indicates what types of updates are available, and server 102 determines, based on information relating to one or more associated systems (e.g., systems 103A-103C), whether one or more software updates of server 101 are applied to systems 103A-103C. If so, server 102 may download one or more applicable updates from update server 101 using an appropriate protocol (e.g., HTTP), and apply such updates to systems 103A-103C as appropriate.

Server 102 may be coupled to systems 103A-103C by one or more network links 105. Links 105 may include one or more networks, components, or media used to communicate information from server 102 to systems 103A-103C. For instance, links may include Ethernet or any other type of network connection and/or active equipment. Server 102 may be, for example, a general-purpose computer system as described in more detail below with respect to FIG. 2. Systems 103A-103C may be, for example, systems that are managed by server 102. Server 102 may include hardware (e.g., a physical server system) as well as software (e.g., executed local to the server 102, and an associated management software application that is executed on a remote client by an administrator).

According to one aspect of the invention, server 102 performs software product update services for systems 103A-103C. Systems 103A-103C may be, for example, devices of a UPS system. These UPS system devices may be, for example, subsystem components of a UPS including environmental monitoring units, UPS system processor components, batteries, air conditioning components, or other systems, devices, or components.

In one embodiment, server 102 may include one or more hardware and/or software protocols to communicate with systems 103A-103C. In one example, a system 103A includes a network management module that provides performance and configuration data to a network management system. In one example, the network management module is capable of being managed using the well-known simple network management protocol (SNMP). The network management module may also be monitored using a web-based interface. Such a web-based interface may be provided by software downloaded to a browser program through a network using the HTTP protocol. Server 102 may be adapted to control and monitor systems 103A-103C using one or more communication protocols, and it should be appreciated that the present invention is not limited to any particular type of protocol.

General-purpose Computer System

A server system 201 according to one embodiment of the invention may be implemented, for example, on one or more computer systems. These computer systems may be, for example, general-purpose computers such as those based on Intel PENTIUM-type processor, special-purpose processors (e.g., the C3 processor available from Via Technologies, Inc.), or any other type of processor. It should be appreciated that one or more of any type computer system may be used to receive and distribute software updates according to various embodiments of the invention. Further, the system may be located on a single computer or may be distributed among a plurality of computers attached by a communications network.

A general-purpose computer system according to one embodiment of the invention is configured to update software programs associated with one or more other systems. It should be appreciated that the system may perform other functions, including updating its own software or perform any other function, and the invention is not limited to performing any particular function or set of functions. For instance, the system may be implemented in an existing commercial product, such as, for example, a network management system. Other implementations are possible, and the invention is not limited to any particular implementation.

Figure 2:
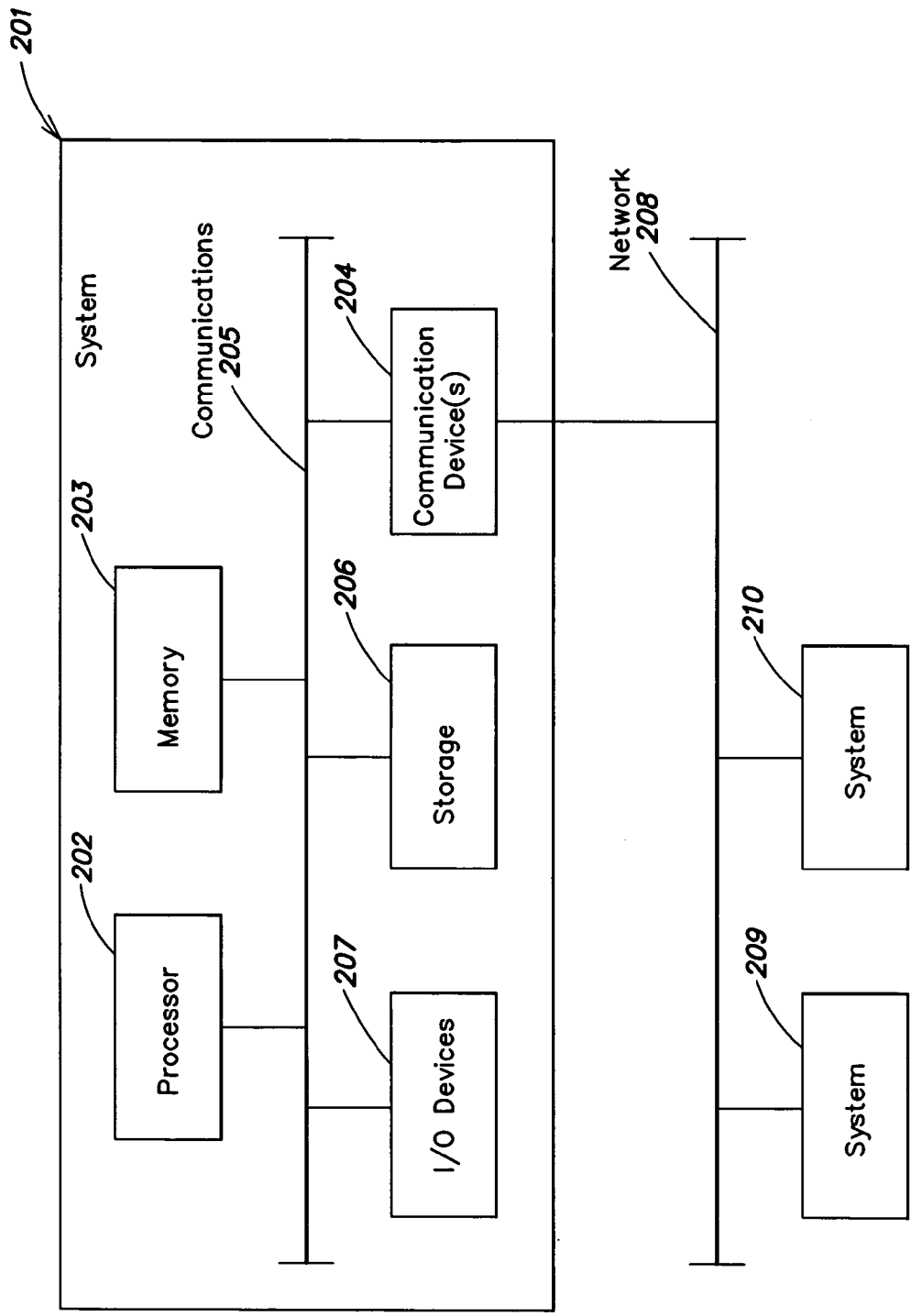
FIG. 2 is a block diagram of a general purpose computer system capable of implementing various aspects of the present invention.

For example, various aspects of the invention may be implemented as specialized software executing in a general-purpose computer system 201 such as that shown in FIG. 2. The computer system 201 may include a processor 202 connected to one or more memory devices 203, such as a disk drive, memory, or other device for storing data. Memory 203 is typically used for storing programs and data during operation of the computer system 201. Devices in computer system 201 may be coupled by a communications device or system 205, which may include, for example, one or more communication elements (e.g., busses, bridges, routers, etc.) that communicate data within system 201. Computer system 201 also includes one or more input/output devices 207, such as keyboard, mouse, or printing device. In addition, computer system 201 may contain one or more communication devices 204 that connect computer system 201 to one or more communication networks (e.g., network 208). In one embodiment of the invention, system 201 is responsible for updating software of devices located on either a public or private network, and therefore the system has two network interfaces—one coupled to a private network and one coupled to a public network.

In one embodiment, various aspects of the invention may be implemented in the InfraStruXure Manager server appliance product available from the American Power Conversion Corporation (APC), West Kingston, R.I. The InfraStrucXure Manager product provides Web browser-based remote management of APC devices.

Although computer system 201 is shown by way of example as one type of computer system upon which various aspects of the invention may be practiced, it should be appreciated that the invention is not limited to being implemented on the computer system as shown in FIG. 2. Various aspects of the invention may be practiced on one or more computers having a different architecture or components that are shown in FIG. 2.

Computer system 201 may be a general-purpose computer system that is programmable using a high-level computer programming language. Computer system 201 may be also implemented using specially programmed, special purpose hardware. In computer system 201, processor 202 is typically a commercially available processor such as the well-known Pentium class processor available from the Intel Corporation. Many other processors are available. Alternatively, various aspects of the invention may be implemented on a special-purpose computing system (having a special-purpose processor and memory.) Such a processor usually executes an operating system which may be, for example, the Windows CE, Windows NT, Windows Server 2XXX, Windows 2000 (Windows ME) or Windows XP operating systems available from the Microsoft Corporation, or UNIX-based operating systems available from various sources (e.g., Linux). Many other operating systems may be used, and the invention is not limited to any particular implementation.

An example hardware configuration of the secondary server that applies software updates according to various embodiments of the present invention includes the following components:

Processor: Via C3 @800 MHz
RAM 256 MB PC133
NIC's 2 Realtek RTL8139C (one coupled to a public network and one coupled to a private network)
Serial Ports 1 RS-232 1 RS-485
USB 2 USB 1.1
HDD 40GB 5400RPM IDE
HW WatchDog 1-255 seconds w/1 second increments Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the system may be distributed to one or more computers (e.g., systems 209-210) coupled to communications network 208. These computer systems 209-210 may also be general-purpose computer systems (e.g., a client computer executing a management program that works in association with system 201). For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Figure 3:
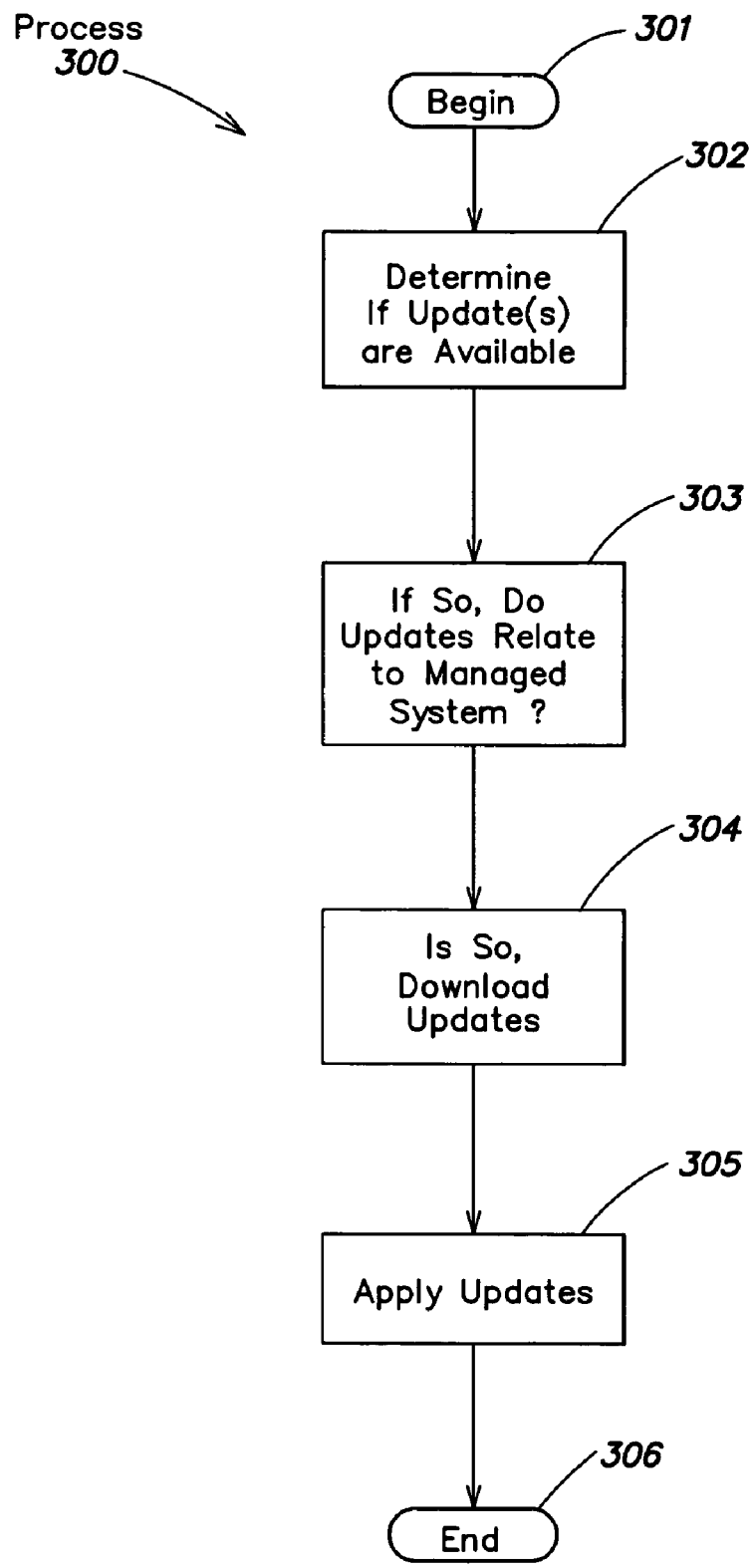
FIG. 3 is a flow chart of a software update process according to one embodiment of the present invention.

One process for updating software according to one embodiment of the invention is shown in FIG. 3. At block 301, process 300 begins. At block 302, the system (e.g., server 102) may be capable of determining whether an update to firmware, application software and software (e.g., application, OS, or both) are available. An update server (e.g., update server 101) may be configured to return a "catalog" of available updates for each product type being checked for updates. This checking may be performed, for example, by software executing on the server responsible for applying the updates to one or more systems (e.g., systems 103A-103C).

At block 302, the system (e.g., the system applying the updates) determines if one or more updates are available. For example, the software program may be configured to determine whether a particular update relates to a managed system. For instance, the software program may compare its own product version, as well as the product versions of one or more of the software products (or entities) it is managing, against the catalog. If it is determined that there are updates for any of the products that server is managing (e.g., at block 303), the server can download (e.g., at block 304) the updates and notify the users of its availability. If the determination that no updates are available, the system may operate in a standby mode or perform other management functions relating to the managed system(s).

The server may also be configured to distribute the update and apply the update to one or more remote systems at block 304. There may also be a facility for uniquely defining a product software type, and for comparing and determining when an update is available. At block 306, process 300 ends. Further, according to one embodiment, a system responsible for applying updates may be part of a modular system having a hardware configuration that is periodically modified. To this end, the server may evaluate components of the modular system to determine whether any of the components need to be updated. For instance, the system may be a part of a modular Uninterruptible Power Supply (UPS) system that provides backup power to computer and other system loads. The system may itself be a component of the overall UPS system.

Figure 4A:
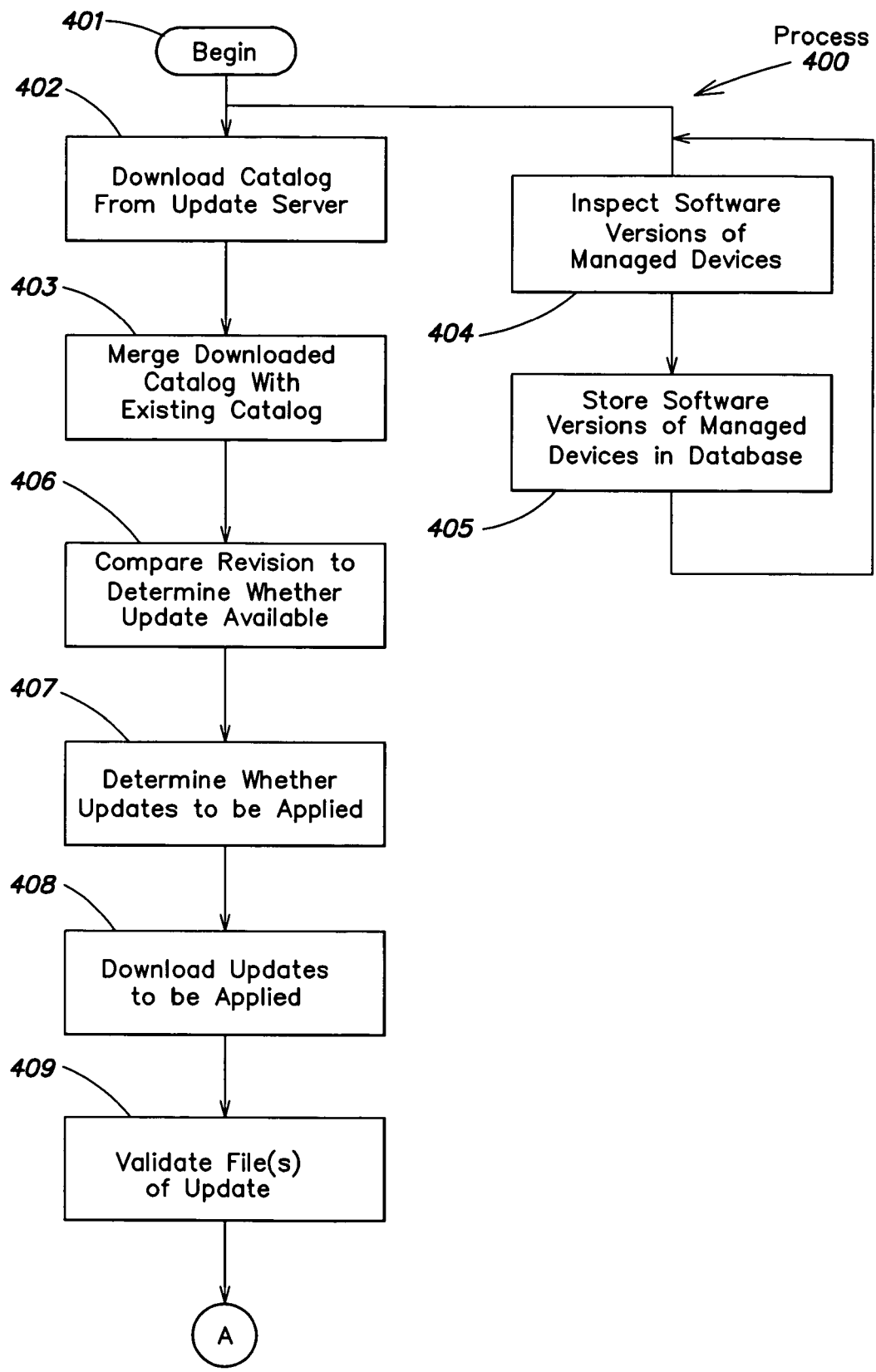
FIGS. 4A-4B show a flow chart of a software update process according to another embodiment of the present invention.
Figure 4B:
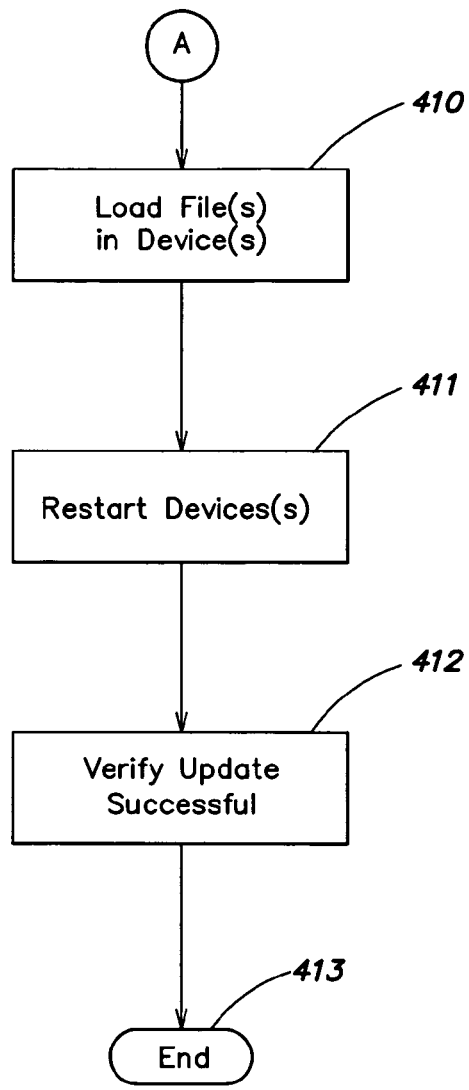

FIGS. 4A-4B show a process 400 for updating a software program. At block 401, process 400 begins. At block 402, a software program executing on a server is configured to download a catalog of available updates (e.g., card or module firmware, plug-in programs for management, application and operating system software) from an update server. In one embodiment, the update server is coupled to the server through a public network such as the Internet. The update server may be placed on a network by a component or systems manufacturer (e.g., the American Power Conversion corporation of West Kingston, R.I.) for the purpose of updating software and firmware in products that have been distributed to consumers. In this manner, consumers can receive new software versions that, for example, address error fixes, provide new features, etc. without having to return the product to the manufacturer or replace the product altogether.

At block 403, the software program merges the catalog of available updates downloaded from the update server with the current catalog (if it exists). If the existing catalog does not exist, it may be constructed from information obtained from each of the managed devices. For example, the software program, when executed, may inspect software versions of software executing on each of the managed devices at block 404. Such inspection may occur, using any communication protocol between the server and one or more of the managed devices. At block 405, the program stores information relating to the software (e.g., software versioning information) for each of the managed devices in a database. This information may be used to create a catalog of information relating to the managed devices.

At block 406, the server software compares the software versions of the entities it is managing against information in the catalog and determines if updates are available based on the comparison.

In another embodiment, the server software is configured to notify a user (e.g., in a graphical user interface, e-mail, etc.) if any of the devices the server software is managing have updates available. In one aspect of the invention, the server software facilitates installation of the updates at the remote devices/systems and provides status reporting (e.g., to a user) identifying the devices/systems that are updated. At block 407, the server software determines whether any of the available updates should be applied to any of the managed devices. If it is determined that any of the updates should be applied to any of the manage systems, the software program may download updates to be applied to the managed devices at block 408. In one embodiment, the updates that are downloaded are only those that relate to managed devices that need to be updated.

The software program may, as an option, validate one or more files of the update at block 409 prior to applying them to the managed devices. This function may be performed, for example, by determining a checksum of one or more portions of the file (or files) comparing it to a checksum located within the file (or set of files). Other methods of verification may be performed.

At block 410, the software program loads one or more files in the applicable managed devices. Such loading may be performed, for example, using one or more file transfer protocols (e.g. TFTP, FTP, etc.) or any other method for loading a program into a device. At block 411, the manage device may need to be reset or restarted so that the update may be placed in effect (e.g., at block 411). Optionally, the software program may verify that one or more of the updates were successful at block 412. Such a verification may be performed, for example, by performing one or more functions (e.g., a status inquiry) or other operation on the manage device that indicates that the device is operating properly. At block 413, process 400 ends.

In one example system, an update server exists that maintains the information about available updates. This update server may be coupled through the Internet and/or other networks to a secondary server. In another embodiment, the update server is configured to listen for requests from software components in the field (e.g., from a secondary server) and is configured to solicit responses containing information about available updates. This update server, for example, may be maintained by an equipment and/or software manufacturer, and the update server can be updated as new releases of software are made available (e.g., by the manufacturer).

In one embodiment, the secondary server may provide management for a large number of devices on the customer's network. For example, the secondary server may managed devices/systems using a network management protocol as discussed above with respect to FIG. 2. As part of the management of these various devices, the server has the ability (e.g., by polling the device using a network management protocol such as SNMP) to obtain the version of the software/firmware running on the devices. The secondary server software provides an update component that queries the update server for available updates.

Upon receiving information identifying available updates, the update component checks software/firmware versions of which it is aware against the versions obtained from the update server. Such a check may be made, for example, by comparing filename information that identifies software currently installed on the system to filename information associated with a particular update. If any updates are available, the updates are downloaded from the update server to the secondary server. Thereafter, the user may be notified of there availability. The user may use the secondary server to distribute the updates to devices in the field as they desire. Further, the secondary server may be adapted to automatically receive and apply updates.

One advantage of having a secondary server is that each device that needs to be updated does not have to contact the update server for updates. Alternatively, a secondary server is provided that determines if updates are available, and downloads the appropriate software from the update server one time. In conventional software distribution systems, the same software is downloaded multiple times by different clients. As a result, each client must have the capability to communicate with the update server, requiring a more capable client. Also, a conventional update server that directly services more than multiple end clients may be inundated with multiple requests for the same file. According to one embodiment, a secondary server is provided that acts as a proxy for multiple devices.

Further, according to one embodiment, the user is provided control over which devices actually get updated, and at what time those updates occur. That is, the download and update of devices do not need to be performed consecutively, i.e., once the update is downloaded, it is applied. Rather, the update process may be user-configurable in that downloads may be applied according to a predetermined schedule or a set of rules some time after the update is downloaded. In the case of a network device or other system component, the update of software may require the device to be reset, and therefore there may be a need to apply the update at a proper time or in a proper sequence.

Further, according to another embodiment, notification of a user is provided when software updates are available. This can occur, for example, when an update matching a particular device managed by the secondary server is available. This notification may be performed, for example, by sending an e-mail to an administrator of the device, or other notification. By contrast, conventional software update systems only notify the user when they use the application.

However, for devices or other systems that are not normally operated by a user (e.g., a UPS system), notification is not provided in conventional devices or systems to determine when an update is available. Therefore, according to one aspect of the present invention, a notification is provided for devices and other systems that are under an administrator's control.

In one example, a secondary server maintains a list of the devices and their identifying information (e.g., model number, firmware/software revisions, etc.) and compares this information to information provided by an update server. Based on the comparison, if an update is determined to exist, a notification is sent to a user (e.g., a network administrator) identifying an available update. Notification of the user when updates are available allows an administrator to "set it and forget it", by allowing the server to notify the administrator when updates are available, instead of having to periodically check (e.g., manually through a website) the update server for updates. Further, as the secondary server is updated to manage new products, the firmware update mechanism for these products is automatically in place to support these new products.

The update server provides a catalog of available updates to the requesting server (e.g., a secondary server) instead of the requesting server sending back each distinct managed component for evaluation. Because, according to one example configuration, the managed components are not transmitted back to the update server, the amount of information that is sent back to the update server (and therefore, the network to which the update server is coupled) is reduced. Further, because an intermediate server is provided for updating field devices and systems, there is a reduced need to modify the update server protocol to support new devices and systems.

The following examples describe various embodiments of a system and method for updating software. The invention is not limited to these particular embodiments, but rather, the invention may include one or more aspects independent of other aspects. The following describes an update server, secondary server, and devices (e.g., UPS system components) managed by the secondary server. In the example, the update server is maintained by a product manufacturer (e.g., the American Power Conversion Corporation (APC)) and is made available for providing software and firmware updates for customer's equipment.

Example Architecture and Design

Figure 5:
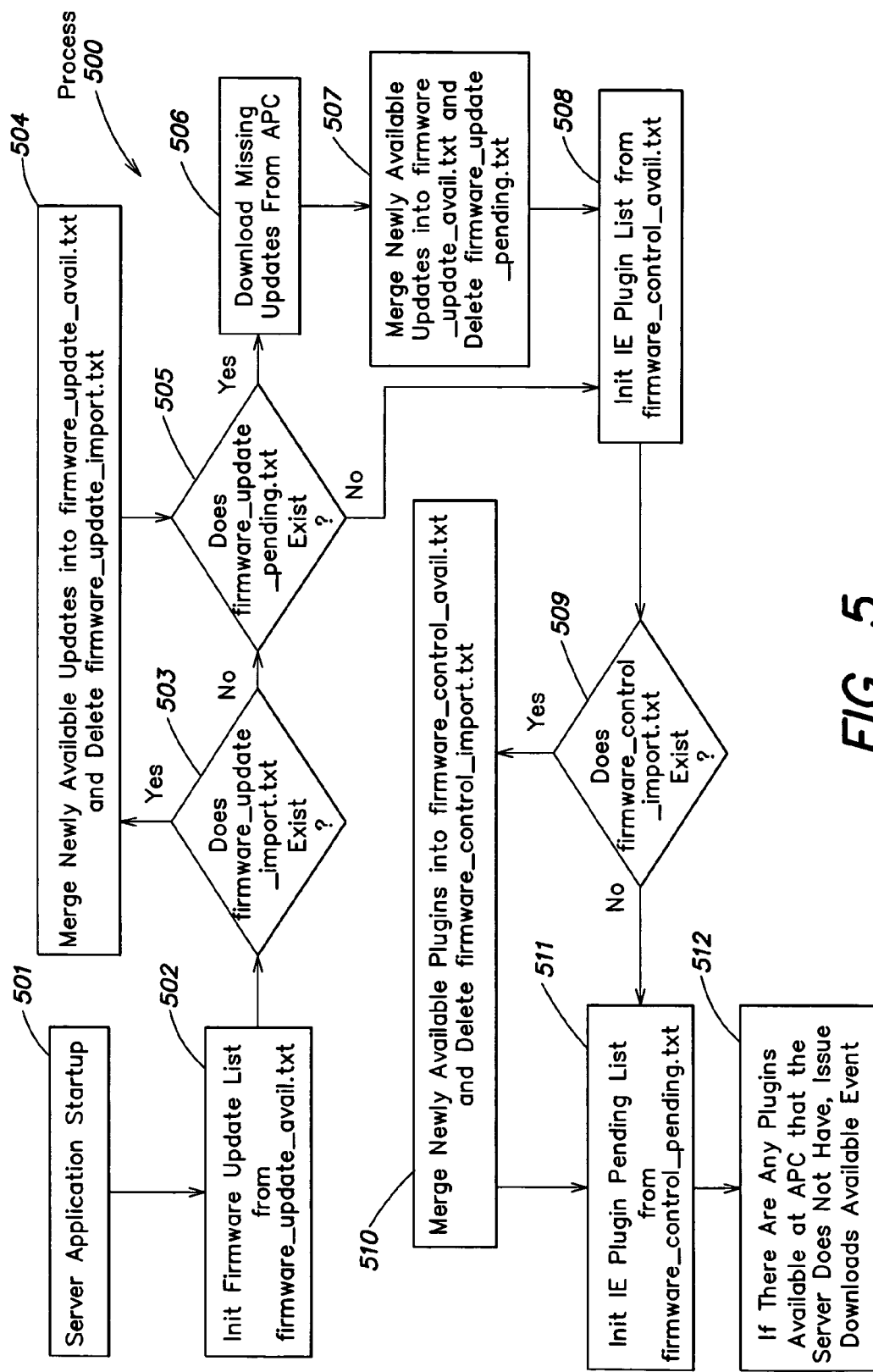
FIG. 5 is a flow chart of a software update process according to one embodiment of the present invention.
Figure 6:
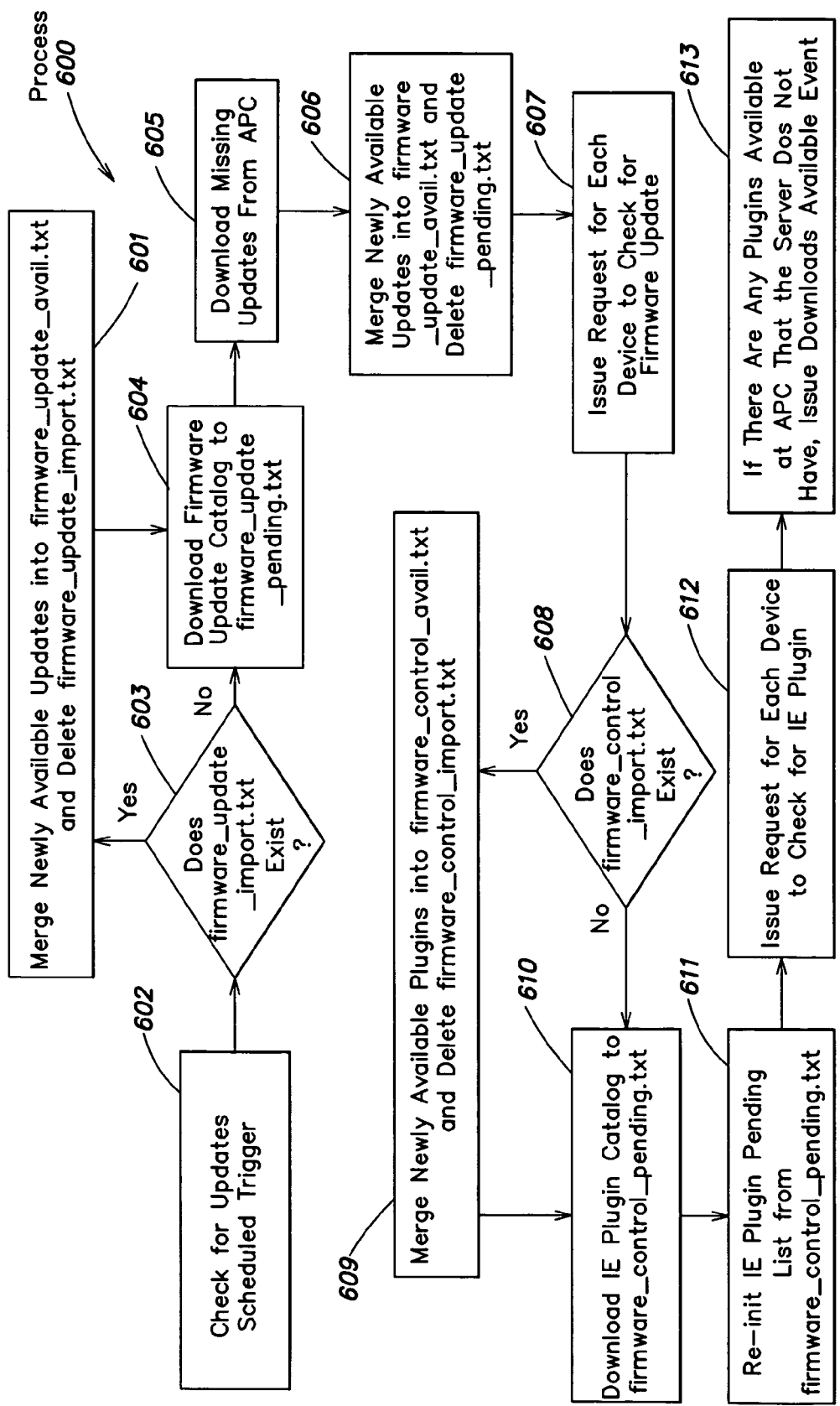
FIG. 6 is a flow chart of a software update process according to one embodiment of the present invention.

FIG. 5 shows an example process 500 for updating a software program according to one embodiment of the invention. More particularly, FIG. 5 shows a process that may be performed by a server responsible for applying updates to one or more managed devices. At block 501, a server program (e.g., an application) is executed at the server (e.g., a secondary server). At block 502, the secondary server initializes a list of available updates from an update server. For example, the list may be a firmware update list of available updates (e.g., firmware_update_avail.txt) which is downloaded from a storage location associated with the update server. At block 503, it is determined whether there are new firmware updates that are available.

In one embodiment, import files may be used that allow for off-line catalog updating to be performed. For example, off-line updating via FTP transfer to thin servers may be used to propagate updates to managed devices. In one example, a user places the import catalogs and firmware updates and management components (e.g., in the form of a "plug-in" program) and places a reference of these updates in the update directory, then during the next server application startup or check for an update, the import catalogs are merged with the available catalogs. More particularly, an import catalog record is merged into the available catalog if its files are present; otherwise, the import catalog record is discarded.

At block 504, the server application merges newly-available updates into the firmware update list and deletes the list of new available firmware updates. At block 505, it is determined whether a pending firmware update list (e.g., a text file) exists. Such a list may be maintained, for example, by the secondary server as updates are downloaded from the update server. For example, this file may be created to track the progress of firmware downloads. If, for example, the process for downloading updates from the update server is not successful, the status of this file may be checked to continue or retry the download process at a later time. In one example, the existence of a pending firmware update list indicates that the download process was unsuccessful.

If the pending download list exists, missing updates are downloaded from the update server at block 506. For instance, the update server may be maintained by a manufacturer (e.g., APC) for providing updates to devices. At block 507, newly available updates are merged into the firmware update available list, and in one example, the pending firmware list is deleted.

At block 508, it is determined whether any controls used to manage or otherwise communicate with the updated firmware on the device needs to be updated. That is, there may be an associated client or management side program for communicating with a manage device having updated software. Such a software component or program may be in the form of a plug-in program added to another program (e.g., the Internet Explorer browser program).

For example, there may be a list of plug-in programs that represent controls for communicating with different devices. A listing of these controls may be available from the update server, and the secondary server may determine whether to load any associated controls. At block 508, for example, the secondary server may obtain a list of plug-in controls from the update server. At block 509, it is determined whether an import list of firmware controls exists. If so, the secondary server merges newly-available plug-ins into the list of available firmware controls and deletes the import list. At block 511, a list of pending updates is maintained for any updates not yet downloaded to the secondary server. If, at block 512, it is determined that there are plug-ins available at the update server that the secondary server does not have, an event may be issued to the server application indicating that downloads are available. Thereafter, the server application may download the appropriate controls.

After the firmware and controls have been downloaded to the secondary server, these updates may be applied to the devices and the programs that manage them. A similar update process may be re-performed to determine whether there are new updates to be applied.

In one embodiment, updates are triggered from the update server to one or more secondary servers. For example, at block 602, the secondary server is configured to check for software updates at the update server. This may be performed, for example, by sending, by the update server, events to registered secondary servers. Alternatively, updates may be determined periodically by the secondary server contacting the update server. In one example, the secondary server may determine whether it contains the most recent list of firmware and control updates. Thereafter, a similar process may be used to update software that is similar to that described above with reference to FIG. 5.

Figure 7:
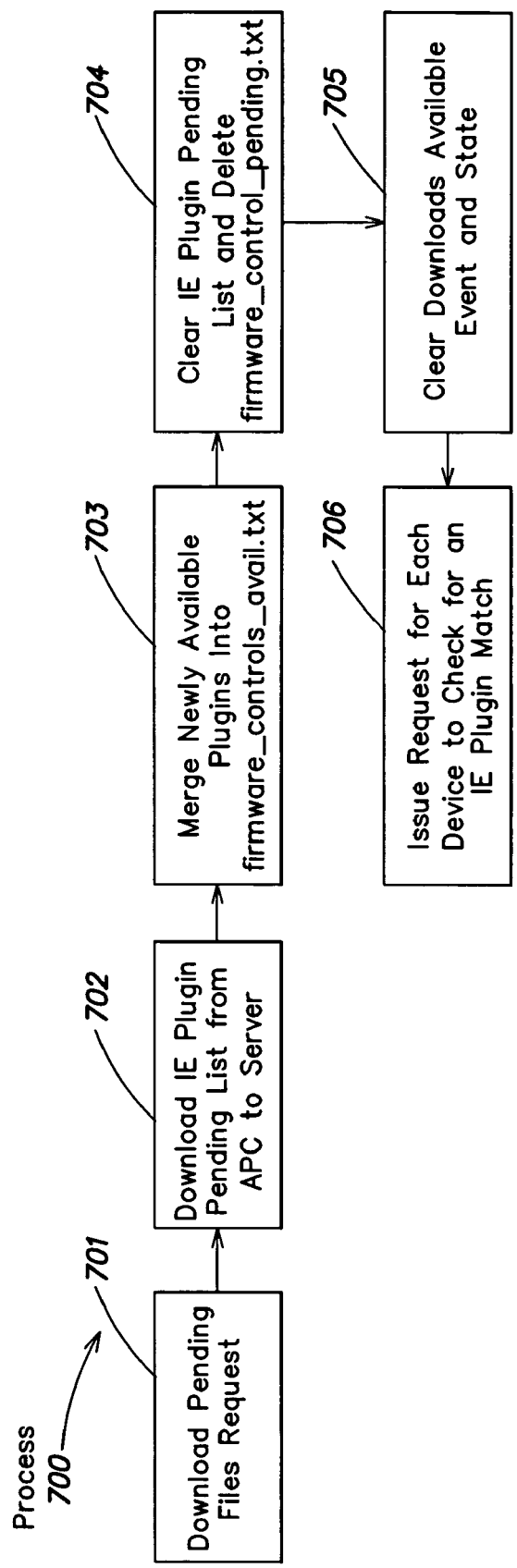
FIG. 7 is a flow chart of a software update process according to one embodiment of the present invention.

FIG. 7 shows a process for downloading available updates. In one example, if a download of a plug-in or firmware update fails, the download will not be made available for another download again until after another check is performed. A pending catalog as described above may be removed after its corresponding download session and only records for successfully downloaded files may be maintained.

If the server shuts down during a plug-in download, the session may not resume automatically when the server restarts. In one example, the user must provide permission again in a new session triggered to download any failed plug-ins. According to one embodiment, any plug-ins already downloaded successfully need not be downloaded again, as their information is maintained in the catalog (e.g., during a merge operations) and they are available for use in updating devices.

At block 701, the secondary server downloads a pending file request from the update server. This list identifies files scheduled for download to the secondary server. At block 702, the secondary server may download a plug-in pending list from the update server. This list may identify any controls needed to manage one or more managed devices. At block 703, the secondary server merges newly available plug-ins into a list of available controls (e.g., firmware_controls_avail.txt). At block 704, the secondary server clears the plug-in pending list and deletes a control pending list. Notably, if the process of downloading one or more plug-ins is unsuccessful, the existence of these files may indicate that some or all of the plug-ins need to be downloaded. At block 702, the secondary server clears a downloads available event and state indicating that new downloads are available at the update server. At block 706, the secondary server issues a request for each device to check for a plug-in match. For instance, there may be some check performed at each device to determine whether the control matches software loaded on a manage device.

FIGS. 8A-8B show software update processes performed as a result of a manage device initialization. Also, when a device is discovered, returns from a communication lost state, or after an update firmware request completes, processes 800, 820 may be performed.

At block 801, a check for firmware update for a single device is made by the secondary server. At block 802, a secondary server polls the device for application and/or firmware file names for the software being executed by the manage device. At block 803, the secondary server determines if the firmware update list includes a newer revision associated with the manage device. At block 804, the secondary server may report that a next version for the manage device is available, and may change an update status associated with the device to indicate that there is an available update to be performed. At block 805, the secondary server issues an update available event and reports a state change indicating that there is an update available for the device. Such indications of state may be presented to a user in an application presented by the secondary server used to manage the devices. Alternatively, indications may be presented to a user or network administrator by other methods (e.g., email message, SNMP trap, etc.)

FIG. 8B shows a check for controls associated with a manage device. At block 821, the secondary server checks the control for a manage device. At block 822, the secondary server polls the device for an application file name associated with a control. If, at block 823, it is determined whether there is an updated control for the particular revision of the device, it is reported that a new control is available at block 824. In particular, the secondary server may report the name of the control and change of status of the device (e.g., in a management application, email, or other indication). At block 825, the secondary server issues an event indicating that a new control is available.

Figure 9:
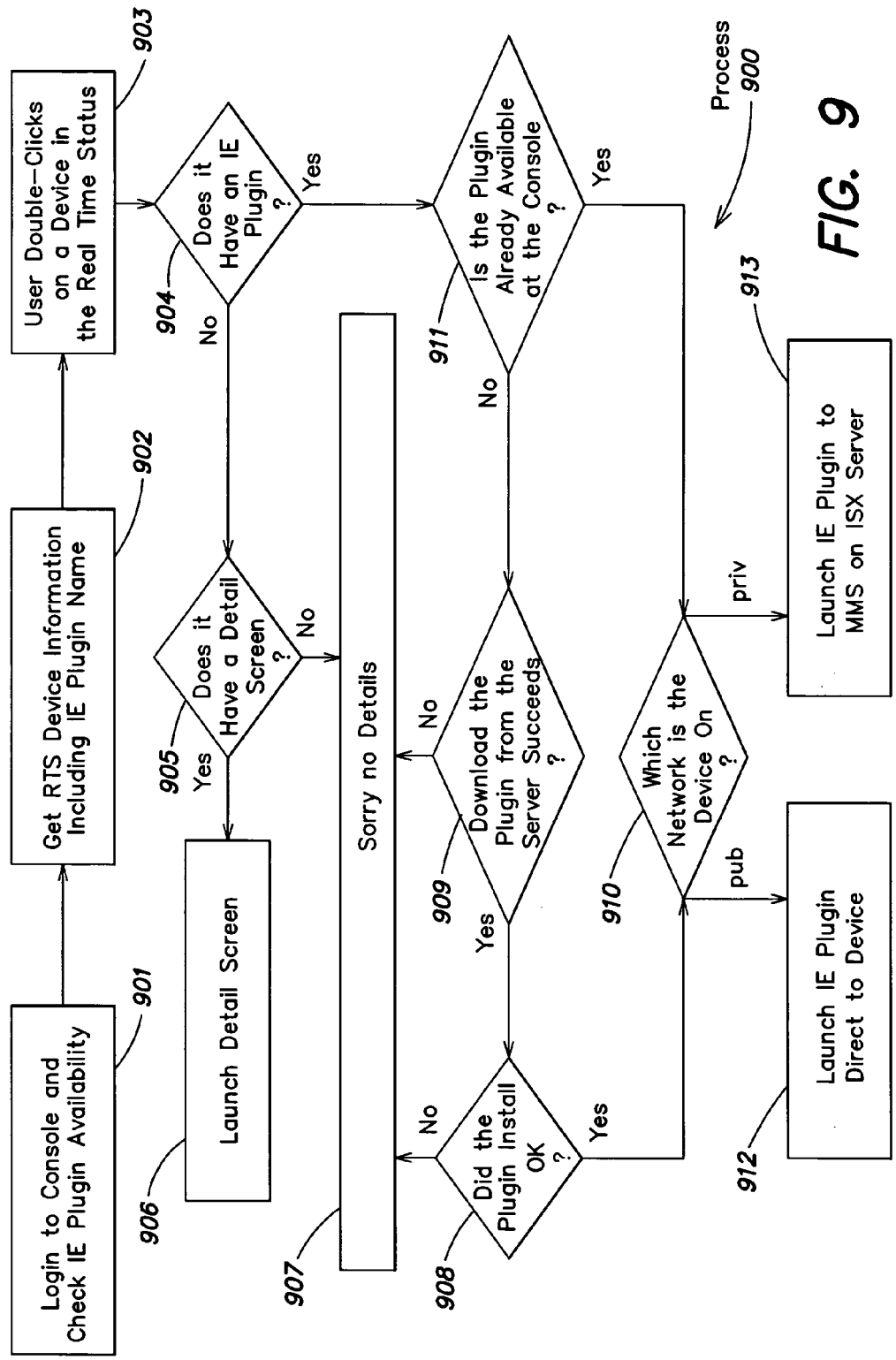
FIG. 9 is a flow chart of a software update process according to one embodiment of the present invention.

FIG. 9 shows a process 900 for updating software in accordance with one embodiment of the invention. In particular, process 900 shows a procedure that may be followed for presenting a management interface to a user for updating one or more management devices. At block 901, a user logs into a console and is allowed to observe the availability of updated components available at an update server. At block 902, the secondary server obtains manage device information including management components used to manage the device. At block 903, the user selects on a device within a status window presented to the user.

At block 904, it is determined whether the device has an associated component. If so, at block 911, it is determined whether the component is already installed at the management console. If so, it is determined which network device is located at block 910. If, for example, the device being updated is located on a public network, the component is installed to the device at block 912. That is, if the device is located on the public network, the component used to manage the device is generally located within a memory of the device, and is downloaded to clients on an as-needed basis. If the device is located on a private network, the component is installed on the secondary server at block 913 to allow the secondary server to manage the device.

If there is no component associated with a particular device, it is determined whether there is a detail screen associated with the device at block 905 that presents information relating to the update. If so, the detail screen is launched at block 906. If not, an indication may be presented to the user at block 907 that there are no details available for this particular device.

If, at block 911, it is determined that there is no component available at the management console, the component is downloaded from the update server. If it is determined at block 909 that the download is successful, then a check may be performed (e.g., at block 908) whether the component was installed correctly. If not, an error message may be indicated to the user at block 907. However, if the component was installed correctly, that component may be installed to the device or the secondary server as appropriate at blocks 912, 913, respectively.

Figure 10A:
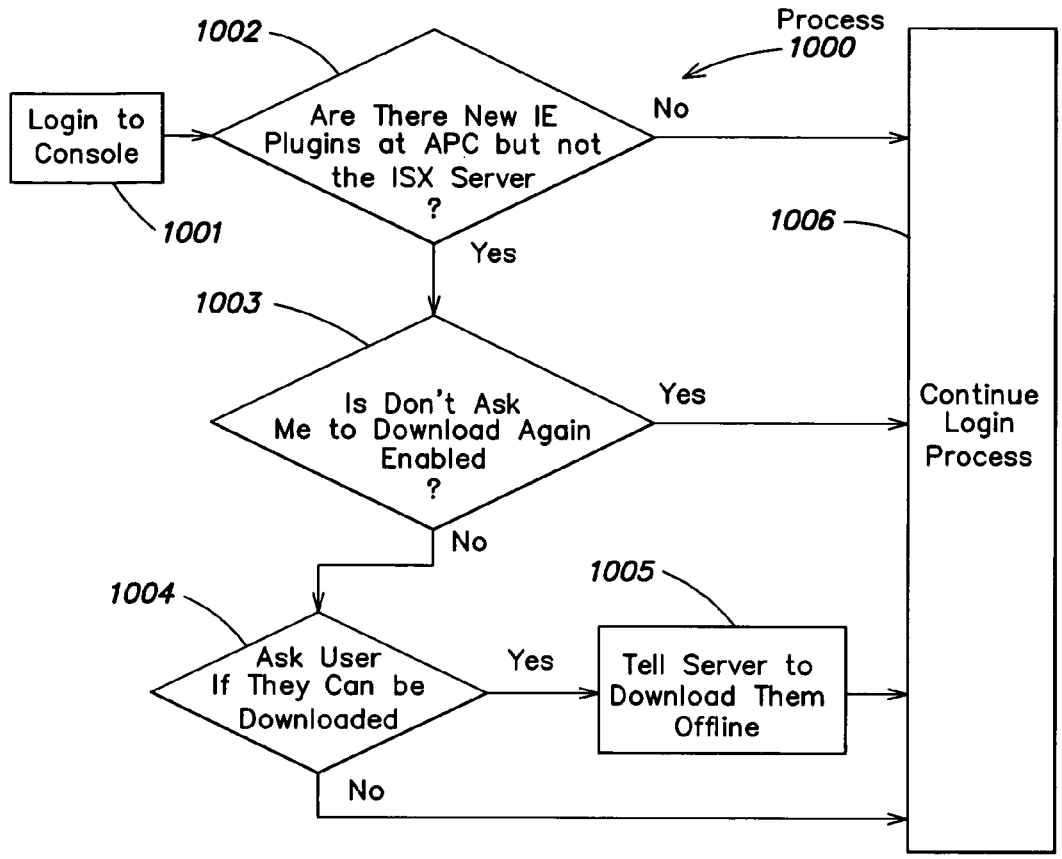
FIGS. 10A-10B show flow charts of a software update process according to one embodiment of the invention.
Figure 10B:
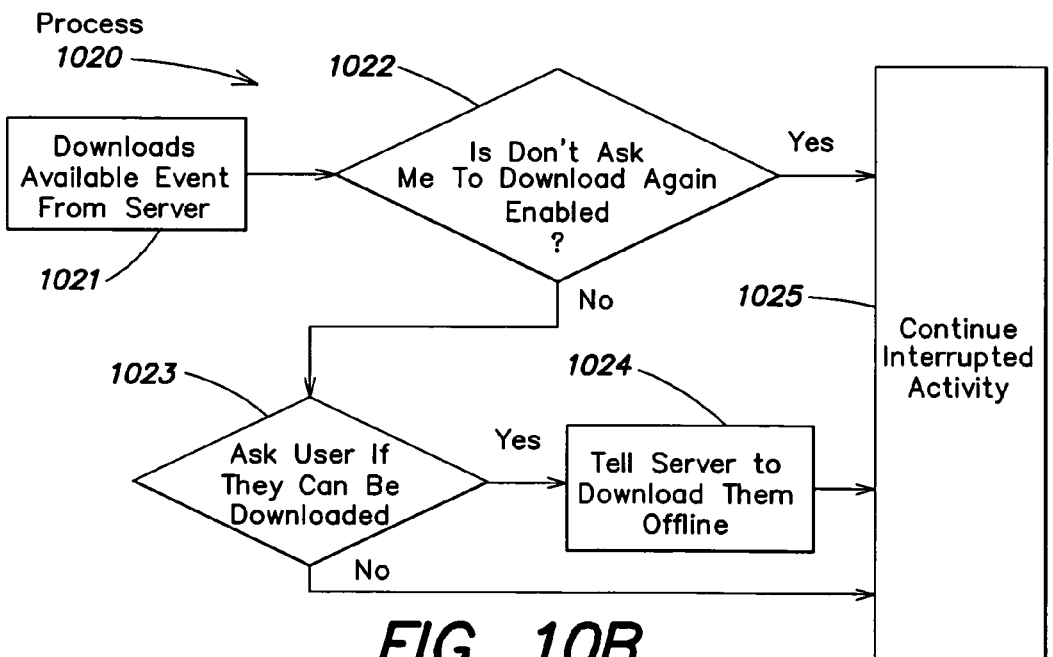

FIGS. 10A-10B show several embodiments relating to downloading software from an update server. At block 1001, a user logs into a console (e.g., as presented by a secondary server). At block 1002 it is determined whether there are components provided by the update server which are not present in the secondary server. If not, the user is permitted to continue the login process at block 1006. If there are new components, it is determined at block 1003 whether a flag is set at the secondary server that indicates whether the user does not want to be prompted for downloading new components. For example, there may be a flag referred to as "Don't Ask Me To Download Again" which can be set in a user interface of the console. If this flag is enabled, then the user is permitted to continue the login process at 1006. If not, the user may be prompted at block 1004, whether the updated components may be downloaded. If so, the secondary server may be instructed to download them offline at block 1005. If not, the user may be allowed to continue the login process at block 1006.

In FIG. 10B, it is determined that a downloads available event was received from the server at block 1021. This indication may be, for example, an indication sent by the update server to the secondary server indicating that a download is available from the update server. If, it is determined at block 1022 that a flag is set indicating that the user does not want to be prompted regarding available downloads, the management process will be continued at block 1025. If the flag is not set, the user may be prompted at block 1023 to provide an indication as to whether the controls may be downloaded from the update server (e.g., in an interface of a management program or by other indication methods). If so, the secondary server is configured to download the updates offline at block 1024. If not, the control is returned to the management console at block 1025.

In one example, the infrastructure may be organized into separate directories for each updateable application to incorporate the needs of multiple products. An "aem" directory is reserved for secondary server product update applications and downloads. This directory is relative to the product update root, https://autoupdatev2.apcc.com/. A software application executing at a secondary server on a client system (or both) that performs software updates, referred to hereinafter as a secondary server software application, includes two functional pieces: firmware updates of Network Management cards and software updates for a secondary server and its managed software components.

Firmware Updates

A secondary server manages the firmware for up to several thousand entities, such as, for example, Network Management Cards (NMCs) associated with managed devices. For network and application efficiency, the secondary server reports its development build number back to the a software application (e.g., a program residing and executing on the update server) and that application returns the complete set of firmware update information. The data is generated at request time, for example, by reading directly from a database describing the available updates. The development build number allows filtering data based on the release status of the reporting product.

According to one embodiment, the secondary server may recognize the following input and output data formats:

Input Data Format

In one embodiment, the secondary server uses an HTTP POST to send the following data fields to a secondary server software application (e.g., a product update Web application). The following shows an example data format according to one embodiment:

TABLE I

Example Input Data Format

| Title | Description | Size |
|---|---|---|
| DevBuild | Field to identify the release status of the product. Typically set to one for development products and changed to zero for released products. The Web application checks the dev build number for items in the product update databases and will return only those items that match the inputted DevBuild value. | 4-byte Integer with a valid range of $-2^{31}$ ($-2,147,483,648$) through $2^{31-1}$ ($2,147,483,647$). |

Output Data Format

According to one embodiment, the data may be returned in an ASCII, comma-delimited text stream. There are 10 fields per update entry separated by a total of 9 commas. Each update entry line returned to the secondary server is guaranteed to have the full set of commas, regardless of blank data fields. A semicolon delimits each update entry. Each entry line returned to the secondary server is guaranteed to end with a semicolon.

TABLE II

Example Output Data Format

| Title | Description | Size/Format |
|---|---|---|
| Hardware | The hardware platform on which this update will run. | Must start with 'hw' followed by two ASCII numbers. Maximum length is 16 characters |
| Type | Indicates the main proxy device. | Maximum length 16 characters. |
| Version | The revision of the TYPE field. | Maximum length 10 characters. (major)(minor)(point)[build] |

TABLE II-continued

Example Output Data Format

| Title | Description | Size/Format |
|---|---|---|
| | | where:<br>major, minor and point are each required fields that must range from 1 to 9, and<br>build (optional) is a single lowercase ASCII letter from a to z, the last the build letter is always dropped from the release version. |
| Special | Indicates special features (most likely extra cost features) of this firmware for a general audience. | Maximum length 16 characters. |
| Customer | Used when the build of firmware is to address a specific customer issue with a specific version of firmware. | Maximum length 16 characters. |
| Build | Required when CUSTOMER field is used, indicates the "version" of the customer's special code. | Build numbers start at 1 and are incremented. There are no provisions for indicating that a customer build is beta. This field is a maximum of 2 characters. |
| ApplicationURL | Fully qualified URL for retrieving the updated application. | Maximum length 150 characters |
| OSURL | Fully qualified URL for retrieving the updated OS. | Maximum length 150 characters |
| DescText | Text describing this update. | Maximum length 240 characters |
| DescURL | Fully qualified URL for viewing/downloading more details about the update. | Maximum length 150 characters |

Other Features

There may be one or more additional features relating to the software update process according to one embodiment of the present invention. For instance, there may be additional features of the secondary server and software update application that may be beneficial in managing the software update process:

Secondary Server

Report information about the customer environment (inventory information, customer registration, etc).

Software Update Application

Cache database requests because the database data generally does not change frequently.

Log additional customer-specific information for each incoming downloaded request.

In another example configuration, the secondary server downloads a full set of product update information. This takes control and flexibility away from the firmware update Web application, because as the secondary server determines the criteria for applying updates.

Server Software Updates

Server software of the secondary server (e.g., a management application program) may be capable of updating all or part of its own application, including applicable plug-in applications. Because product update requests for the secondary server may be performed on a one-to-one basis (one request for each instance of the secondary server), the secondary server may report data describing its current version back to a program or other entity on the update server. This information will allow the secondary server product update (e.g., a web-based application) application to determine which update, if any, applies to that secondary server software version.

Information for updateable product versions may be contained in a database located on the update server. Information for each of the updates may be contained in an associated database. The Web application may, in one example, return the URL location (e.g., a secure HTTP URL) where one or more updates may be located.

Input Data Format

In one example, the secondary server uses an HTTP POST to send the following data fields to the secondary server product update application. Table III below shows an example input data format according to one embodiment of the present invention:

TABLE III

Example Input Data Format

| Title | Description | Size |
|---|---|---|
| Product Name | The name of the product in the field. For example, the Product Name may be "APC Enterprise Manager" | Maximum length 100 characters |
| Product Version | The version of the product in the field. In one example, this version may be the 4-digit version number in the format of major.minor.rev.build | Maximum length 100 characters |
| OSName | The name of the OS | Maximum length 100 characters |
| OSVersion | The version of the OS | Maximum length 100 characters |
| Language | The Locale language (e.g., English) | Maximum length 100 characters |
| Country | The Locale country (e.g., the United States) | Maximum length 100 characters |

Output Data Format

The secondary server product update Web application has, according to one embodiment, three response scenarios:

1. If the required data is not received by the secondary server product update Web application, the application returns "Malformed Request"
2. If there are no updates applicable to the reported secondary server software version information, the application returns, "No Update Available"

3. If there is an update applicable to the reported secondary server software version information, the application returns the following data.

Table IV below shows an example data format according to one embodiment of the present invention:

TABLE IV

Example Data Format

| Title | Description | Size/Format |
|---|---|---|
| Product Name | The product name for the update (typically the same as the requesting product, but included to accommodate name changes) | Maximum length 100 characters |
| Product Version | The version of the update | Maximum length 50 characters |
| DescText | . Text describing the update | Maximum length 240 characters |
| DescURL | Fully qualified URL for viewing/downloading more details about the update. | Maximum length 150 characters |
| UpdateURL | Fully qualified URL for retrieving the update. | Maximum length 150 characters |

Other Features
  Report information about the customer environment (inventory information, customer registration, etc).
  Product Update application
  Log additional customer-specific information for each incoming request.

According to one embodiment, the secondary server software may use secure HTTP connections or FTP connections to download available updates.

The auto update server may store a separate table for storing web card upgrade records. A catalog may be updated to allow a product manager to associate a product update with a software kit (e.g., for a managed device).

When updating the firmware on a device (e.g., a card) according to one embodiment, the secondary server software sends both OS and application layer, with the OS being sent first, followed by the application layer software. It is appreciated that anytime you send any binary to the card, you wipe out the current application layer. Therefore, it is preferable to download both OS and Application layer software to the card.

According to one embodiment, the secondary server may inspect a managed device to ensure that an OS layer update was successful. In one example, the secondary server may perform a listing (e.g., via an "ls" command) of the root FTP directory and may perform a check of the OS layer file. If the secondary server is permitted to log in and the upgrade was successful, the OS file is the new file. If the secondary server is permitted to log in, and the update was not successful, the OS layer file is the previous OS layer.

One method for determining whether the application is operating correctly includes performing an inquiry of an expected SNMP OID of the web card, and if the web card is able to respond, SNMP is up, thereby indicating the application layer is up.

An alternative method includes performing a listing (e.g., via an "ls" command) of the root FTP directory and identifying whether an event file used by the application layer (e.g., "event.txt") exists. If an attempt is made to upgrade the card a number of times (e.g., two attempts with two consecutive failures), this occurrence may be considered a hardware failure. To update one type of card, for example, the secondary server software may need a user/password/port to access the FTP server on the web card.

Update File Format and Naming Conventions

According to one embodiment, the binary firmware file includes a header. In one embodiment, the header contains identification information about the file and a checksum of both the entire file and the header. This checksum can be used to validate the file before attempting to send the file to the card (e.g., using FTP).

The following information relates to various implementations of the file formats and naming system used in the example:

Executable type for the control: DLL is the entry point for launching (the control may include support files, like other DLLs, help, for example)

Naming format for the control: apc_plugin_<app layer>_<control version>. For example, apc_plugin_r-pdu_1.0.0.7.dll Plug-ins may be versioned similarly to other software major.minor.point.build (e.g. 6.1.1.107)

Delivery container for the control: CAB file with the above naming format. For example, apc_plugin_rpdu_1.0.0.7.cab Information used by secondary server to match device to control: Application layer file name, including version, is matched to a catalog entry.

Information provided by the server to the console to indicate the control to launch for an individual device: CAB filename, with extension but without path. For example, apc_plugin_rpdu_1.0.0.7.cab Delivery method for the control from server to console: HTTP request. For example, http://<server ip>/<FTP directory>/<CAB file name>

CAB file location on server: ftp directory. example, /apcstore1/updates

Control installation location on console: <SystemDrive>:\Program Files\APC\Common Clients\<CAB filename>. ex c:\Program Files\APC\Common Clients\apc_plugin_rpdu_1.0.0.7.cab.

According to one embodiment, a device's application layer file name must match a catalog entry exactly for the control to be associated with the device. Because the version information should match, there should be a catalog entry for the specific firmware revision in order to select a control. Multiple firmware revisions may be mapped to the same control, but in one embodiment, each requires its own catalog entry. Therefore, multiple revisions of the same control may remain active within the single system if there are devices with different firmware revisions.

Figure 11:
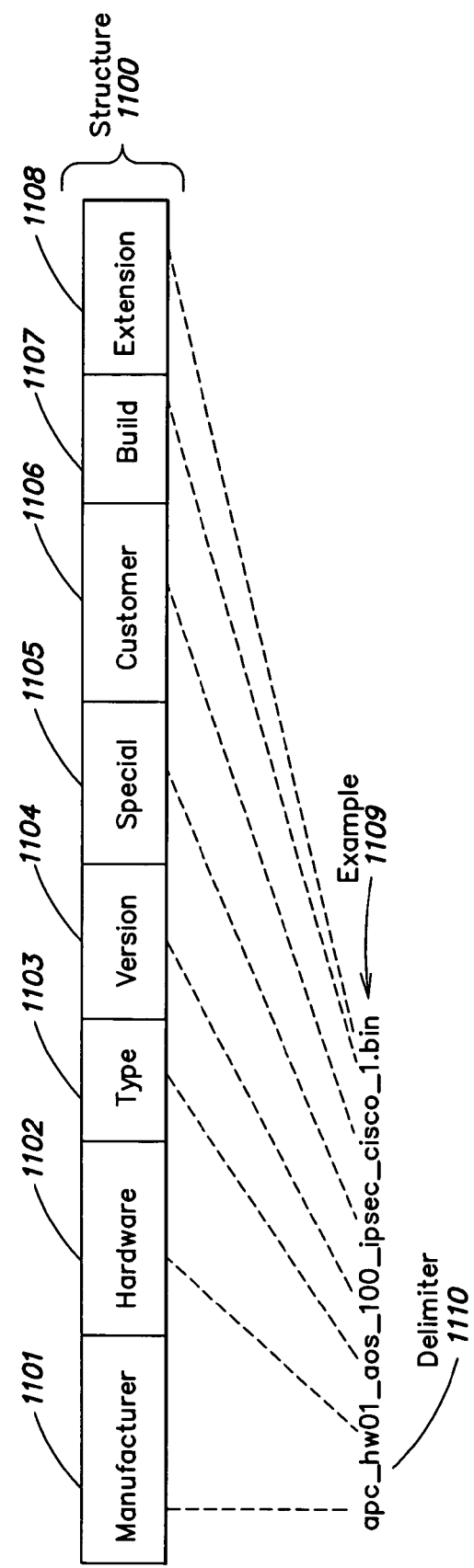
FIG. 11 is a block diagram showing a software naming format according to one embodiment of the present invention.

According to one embodiment, one-to-one matching can be used to avoid having to perform compatibility testing of a new control with older firmware revisions. The trade-off of one-to-one matching is that the catalog can get quite large over time as can the disk space consumed by controls. An example file naming convention according to one embodiment of the invention is shown by way of example in FIG. 11, and examples of which format appears and are explained in Table V below:

TABLE V

Example Data Format

| Field | Status | Description | Example | Example Meaning |
|---|---|---|---|---|
| MANUFACTURER 1101 | Required | Indicates this file is from a particular manufacturer (e.g., APC) | apc_hw01_sumx_100.bin | Hardware platform 1 Smart-UPS app version v1.0.0. |
| HARDWARE 1102 | Required | The hardware platform on which this binary will run. A hardware platform may include several SKUs. The Web site may indicate which SKUs belong to which hardware platform. In one example, must start with 'hw' and followed with two ASCII numbers. Maximum length 16 characters. Currently defined hardware platforms: hw00 = AP9606 (reserved in memory of Arakni) hw01 = RESERVED hw02 = AP9617, AP9618, AP9619 skus | apc_hw02_bigviking_100.bin | Web Card hardware platform apc001, version v1.0.0. bigviking is the firmware name (Big Viking in this example) |
| TYPE 1103 | Required | Indicates the main proxy device, must be unique for all firmware versions. Maximum length 16 characters. | apc_hw02_silcon-dp300_100.bin | The after-market AP9618 Silcon DP300 series application layer v1.0.0 |
| SPECIAL 1105 | Optional | Indicates special features of this firmware for a general audience. Maximum length 16 characters. | apc_hw03_master switchplus320 b_ipsec.bin | Firmware for the aftermarket AP9225 MasterSwitch plus v3.2.0.b beta with IPSec security. |
| VERSION 1104 | Required | The revision of the TYPE field. Maximum length 10 characters. (major)(minor)(point)[build] where: major (required) is the ASCII representation of a decimal Number from 1 to 9, minor (required) is the ASCII representation of a decimal number from 1 to 9, point (required) is the ASCII representation of a decimal number from 1 to 9, build (optional) is a single lowercase ASCII letter from a to z, the last the build letter is always dropped from the release version. The major number is incremented when there is a major firmware upgrade, overhaul, or rewrite. The minor number is incremented when some significant new features have been included in the firmware. The point number is incremented when only performance or bugs have been fixed. The build letter is incremented when new beta builds are created, and the build letter is dropped for all officially released versions. | apc_hw02_symmetra_123a.bin | v1.2.3.a beta version of the AP9617 supporting the APC Symmetra product. |
| CUSTOMER 1106 | Optional | Used when the build of firmware is to address a specific customer issue with a specific version of firmware. Maximum length 16 characters. | apc_hw02_master switchvm_100_abovenet_12.bin | Build 12 of firmware for AboveNet based directly off of the MasterSwitch VM v1.0.0 code base. |
| BUILD 1107 | Required when CUSTOMER field is present | Required when CUSTOMER field is used, indicates the "version" of the customer's special code. Build numbers start at 1 and are incremented. There may or may not be provisions for indicating that a | apc_hw01_sumx_100_mlynch_23.bin | Build 23 of firmware for Merrill Lynch based off of the sumx v1.0.0 code base. |

TABLE V-continued

Example Data Format

| Field | Status | Description | Example | Example Meaning |
|---|---|---|---|---|
| | | customer build is beta. This field is a maximum of 2 characters. | | |
| EXTENSION | Required | The filename extension for the file. For instance, the extension may be ".bin" to indicate a binary file. | apc__hw02__symmetra__123a.bin | |

The above naming and numbering conventions may be used to satisfy many software update scenarios. For example, in one embodiment, the name reflects the type of device the control works with but does not include any application layer version information because a single control may be associated with multiple firmware revisions. Also, a control may be revised without a corresponding revision to the firmware.

A CAB file can contain multiple files so controls do not need to be a single file. According to one embodiment, the control must be signed. Security provided by control signing may be used, for example, by a Web browser in the standalone case. Alternatively, security can be used by a secondary server. In any case, the secondary server should inspect the control to ensure that the control has not been modified and that it was delivered by the manufacturer unchanged.

The main trade-off with this approach is simplicity over disk space.

Simplicity—It is relatively easy for both the server and console to detect whether they need to download a control. Using file names for versioning and separate subdirectories for controls eliminates versioning issues (e.g., determining whether there is a newer version of the control available, is the latest version of the control backward compatible with all firmware revisions, is the new version of DCal.dll backward compatible with older controls, are there support files without version information, etc.)

Disk Space—Every time a file in the CAB changes, the names of the CAB and control must change. According to one embodiment, a current revision of a control never overwrites a previous one (e.g., neither the CAB file nor the control). According to another embodiment, no support files (e.g., such as DCall.dll) are shared among controls. According to one example, each control has its own complete set of all its support files. The system may include a periodic cleaning scheme (e.g., delete files that have not been used in x days, months, years, etc).

An example format of the <control version> follows the same convention as the card: wxyz, where w=major 1-9, x=minor 0-9, y=point 0-9, z=beta a-z, A-Z. That does restrict each to 1 digit/character (123a=1.2.3.a). Also, it may be necessary to translate a build number to a beta character.

The Program Files directory (as on a Windows-based computer) may be used as an installation location for controls because its contents are visible to the user, is available on all Windows operating systems types and localized versions the console supports and can be retrieved by the console from the OS. Controls are not installed under the console working directory (e.g., c:\WinNT\Downloaded Program Files\APC\Common Clients\<CAB Filename>) because these subdirectories and files are visible to the user only through the command prompt. The software may be installed, in another alternative under <SystemDrive>:\Documents and Settings\All Users.

Updates may be divided into three categories:
1. Firmware Updates for the devices (e.g., web cards):

According to one embodiment, firmware updates relate to any update that the secondary server will subsequently push out to a managed device (e.g., a Network Management Card). The files associated with this include the Firmware update Catalog, firmware_update_available.txt, which contains a list of all the available FW updates, what the versions are, and where secondary server needs to look to pull them down from the update server. The secondary server uses this catalog to determine if there are updates available for its devices, and to determine the location of such binary updates. An example of the binary update file would be apc_hw02_rPDU__220g.bin.

Once the secondary server has determined there are updates available, the user may be prompted to download them from the update server, and if they have selected to, they will be notified via email that updates are available. The secondary server software program downloads all the binaries in the catalog to a storage medium associated with the secondary server, and then the user will be presented with a dialog that allows them to select the devices to be updated. The secondary server may present a status report to the user of success and failures of the firmware update process.

2. Common Client Plug-ins for Secondary Server Software Program

According to one embodiment, common client plug-ins for the secondary server software program are highly functional clients designed to manage specific devices. So, from a management status screen, if the user selects a device, the user is presented device details and some management capabilities. If there is a common client available to manage a device, the interface may provide the full access to all the features of the device, with a much greater usability, and look and feel. These common clients are created for devices over time, and when they are available, they are posted to the update server. When a secondary server performs a check for updates, the secondary server will detect if common clients are available and download them.

Once downloaded, when a user attempts to double click on a device that can be managed by a common client, the client will be distributed to that user's client machine and launched. The files associated with the common client include a cab file, apc_plugin_rpdu_1.0.0.13.cab. That cab file includes a plug-in launcher and numerous .dll's needed to actually load the plug-in. The Plug-ins have their own "catalog" file, firmware_control_available.txt, which is much like the firmware update catalog in that it describes what version of plug-in it is, and what device that plug-in manages. The secondary server may use this catalog to determine if any plug-ins are available to be used with the devices being managed at this server.

The CAB files as described above contain the common client plug-in distribution. According to one embodiment, the only control is in a stand-alone application, outside of the secondary server, the common client may be used to manage a device, one to one, then a loader control may be used to actually load the plug-in (e.g., a.dll file).

The following format/characteristics may be used for a catalog file:
- Text based
- Comma delimited
- Semi-colon at the end of each line Fields in the Firmware Update file include:
hardware, application, version, special, customer, build, application URL, OS URL, descriptive text, descriptive URL Fields in the Common Control file include:
hardware, application, version, special, customer, build, local, application URL Although various file formats and locations have been described herein with particularity, it should be appreciated that the invention is not limited to any particular implementation.

Having thus described several illustrative embodiments, various alterations, modifications and improvements will readily occur to those skilled in the art. Such alterations, modifications, and improvements are intended to be within the spirit and scope of the invention. Accordingly, the foregoing description is by way of example only and is not intended as limiting.

The invention claimed is:

1. A method for updating software in a system comprising an update server, a secondary server and at least one managed device, the update server being adapted to store one or more software updates, the secondary server being adapted to communicate with the update server using a first protocol and to communicate with the at least one managed device using a second protocol, the method comprising acts of:
receiving, by the secondary server from the update server using the first protocol, a catalog of updates available from the update server;
determining, by the secondary server managing at least one managed device, that at least one available update referenced in the catalog of updates applies to the at least one managed device, the at least one available update including an operating system component and a management component, the at least one managed device being an uninterruptible power supply (UPS) not capable of communicating using the first protocol;
downloading, using the first protocol, the at least one available update to the secondary server; and
applying, by the secondary server using the second protocol, the at least one available update to the at least one managed device by applying the operating system component to the at least one managed device prior to applying the management component to the at least one managed device.

2. The method according to claim 1, further comprising acts of:
maintaining a local catalog of updates; and
merging the received catalog of updates with the local catalog of updates.

3. The method according to claim 1, wherein receiving, by the secondary server from the update server via the first protocol, includes receiving using internet protocol, and applying, by the secondary server using the second protocol, includes applying using a serial protocol.

4. The method according to claim 3, wherein the secondary server performs one or more updates for a plurality of managed devices.

5. The method according to claim 4, wherein the plurality of managed devices are each components of a UPS system, and wherein the secondary server applies the one or more updates to selected components of the UPS system.

6. The method according to claim 3, wherein applying using a serial protocol includes applying using a universal serial bus protocol.

7. The method according to claim 1, wherein the act of determining comprises an act of comparing filename information of a file associated with the at least one available update to filename information of a current portion of software associated with the at least one managed device.

8. The method according to claim 7, wherein the act of comparing filename information of the file associated with the at least one available update to the filename information to the current portion of software of the at least one managed device includes an act of comparing revision level information of the file associated with the at least one available update with revision level information of the current portion of software of the at least one managed device, and determining whether the at least one managed device should be updated based on the comparison.

9. The method according to claim 8, further comprising an act of determining whether the revision level of the at least one available update is a later revision of software as compared to the revision level file associated with the at least one available update to the filename information to the current portion of software of the at least one managed device.

10. The method according to claim 1, further comprising an act of sending at least one file to the at least one managed device.

11. The method according to claim 1, further comprising an act of verifying that at least one file associated with the at least one available update is not corrupted, and wherein the act of verifying is performed prior to the act of applying.

12. The method according to claim 11, wherein the acts of verifying and applying are each performed by a secondary server.

13. The method according to claim 1, further comprising an act of determining, on behalf of a plurality of devices, whether an update exists on the update server.

14. The method according to claim 1, wherein the act of applying the at least one available update further comprises an act of applying the management component to a manager of the at least one managed device.

15. The method according to claim 14, wherein the act of applying the management component to the manager includes an act of applying the management component to the manager while the at least one managed device is coupled to a private network.

16. The method according to claim 14, wherein the act of applying the management component to the manager includes an act of applying the management component to a manager adapted to apply the at least one available update.

17. The method according to claim 1, wherein the act of applying the management component includes an act of applying the management component to the at least one managed device while the at least one managed device is coupled to a public network.

18. A system for updating a software component, the system comprising:
an update server including a first memory device and a first processor configured to store a plurality of available updates and to communicate using a first protocol; and
a secondary server including a second memory device and a second processor adapted to manage a plurality of devices and to communicate using a first protocol and a second protocol, wherein the secondary server is adapted to determine that at least one available update of the plurality of available updates should be applied to at least one of the plurality of devices, the at least one available update including an operating system component and a management component, and to download, using the first protocol, the at least one available update to the secondary server and to apply at least one of the plurality of updates to the at least one of the plurality of devices using the second protocol by applying the operating system component to the at least one of the plurality of devices prior to applying the management component to the at least one of the plurality of devices, the at least one of the plurality of devices being an uninterruptible power supply (UPS) not capable of communicating using the first protocol.

19. The system according to claim 18, wherein the secondary server is adapted to compare filename information of a file associated with the at least one available update to filename information of a current portion of software of the at least one of the plurality of devices, and is adapted to determine whether the at least one of the plurality of devices should be updated based on the comparison.

20. The system according to claim 18, wherein the secondary server comprises an interface adapted to receive a catalog of available updates from the update server.

21. The system according to claim 20, wherein the second memory device stores a local catalog of updates, and wherein the secondary server is adapted to merge the received catalog of updates with the local catalog of updates.

22. The system according to claim 18, wherein the secondary server is adapted to compare filename information of a file associated with the at least one of the plurality of updates to filename information of a current portion of software associated with the at least one of the plurality of devices.

23. The system according to claim 22, wherein the secondary server is adapted to determine whether the at least one of the plurality of devices should be updated based on the comparison.

24. The system according to claim 18, wherein the secondary server is adapted to load at least one file associated with the at least one of the plurality of updates to the at least one of the plurality of devices.

25. The system according to claim 18, wherein the plurality of devices are each components of a UPS system, and wherein the secondary server is adapted to apply the at least one update to one or more selected components of the UPS system.

* * * * *